(12) United States Patent
Bies et al.

(10) Patent No.: US 11,143,481 B2
(45) Date of Patent: Oct. 12, 2021

(54) MODULAR EXPANDABLE TUBE ASSEMBLY AND LAUNCH SYSTEM

(71) Applicant: Raytheon Company, Waltham, MA (US)

(72) Inventors: Philip A. Bies, Carmel, IN (US); Ryan K. McLean, Carmel, IN (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 16/410,606

(22) Filed: May 13, 2019

(65) Prior Publication Data

US 2020/0363155 A1  Nov. 19, 2020

(51) Int. Cl.
*F41B 4/00* (2006.01)
*B64D 1/02* (2006.01)
*F41F 5/00* (2006.01)

(52) U.S. Cl.
CPC .................. *F41B 4/00* (2013.01); *B64D 1/02* (2013.01); *F41F 5/00* (2013.01)

(58) Field of Classification Search
CPC ..... B64D 1/02; B64D 1/04; F41F 5/00; F41B 4/00
See application file for complete search history.

(56) References Cited

U.S. PATENT DOCUMENTS

| | | | |
|---|---|---|---|
| 1,211,738 A * | 1/1917 | Marty | A63B 69/406 124/6 |
| 3,371,891 A * | 3/1968 | Brader, Sr. | B64D 1/02 244/137.3 |
| 4,161,301 A | 7/1979 | Beardsley | |
| 4,256,012 A * | 3/1981 | Cowart | B64D 1/08 244/118.1 |
| 4,349,168 A * | 9/1982 | Barnes | B64D 9/003 244/137.3 |
| 4,923,148 A * | 5/1990 | Fillingham | B63G 3/00 244/137.1 |
| 5,103,712 A | 4/1992 | Minovitch | |
| 6,347,567 B1 * | 2/2002 | Eckstein | B64D 1/04 89/1.59 |

(Continued)

FOREIGN PATENT DOCUMENTS

| | | |
|---|---|---|
| GB | 2197277 A | 10/1986 |
| GB | 2361985 B | 4/2004 |
| WO | 2017037699 | 3/2017 |

OTHER PUBLICATIONS

International Search Report and Written Opinion for corresponding International Application PCT/US2020/025255 dated Jul. 15, 2020.

*Primary Examiner* — John A Ricci
(74) *Attorney, Agent, or Firm* — Renner, Otto, Boisselle & Sklar, LLP

(57) ABSTRACT

A tube launch system is used for launching payloads from a platform and includes at least one tube launch section that is removably mounted to the platform, a plurality of powered wheels that are electrically powered and arranged in the tube launch section for propelling the payloads through the tube launch section, and a power source configured to operate the powered wheels. The tube launch system may include a magazine having an endless conveyor and powered magazine wheels that are engageable with the payloads to move the payloads from the endless conveyor to the tube launch section.

20 Claims, 7 Drawing Sheets

(56) References Cited

U.S. PATENT DOCUMENTS 9,863,739 B2 1/2018 Hester, Jr.
2009/0217918 A1* 9/2009 McKenzie ............ A63B 69/406
124/78

* cited by examiner

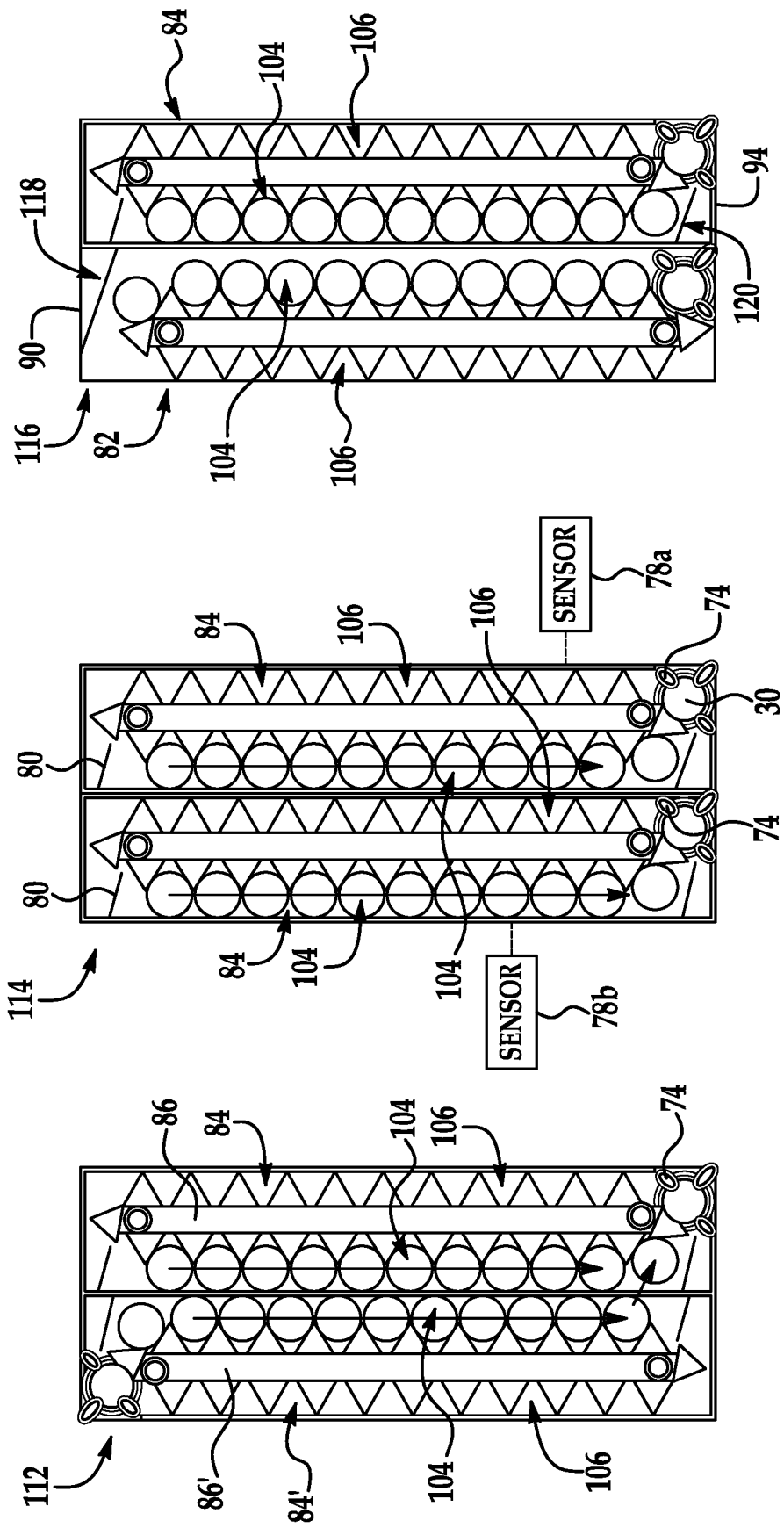

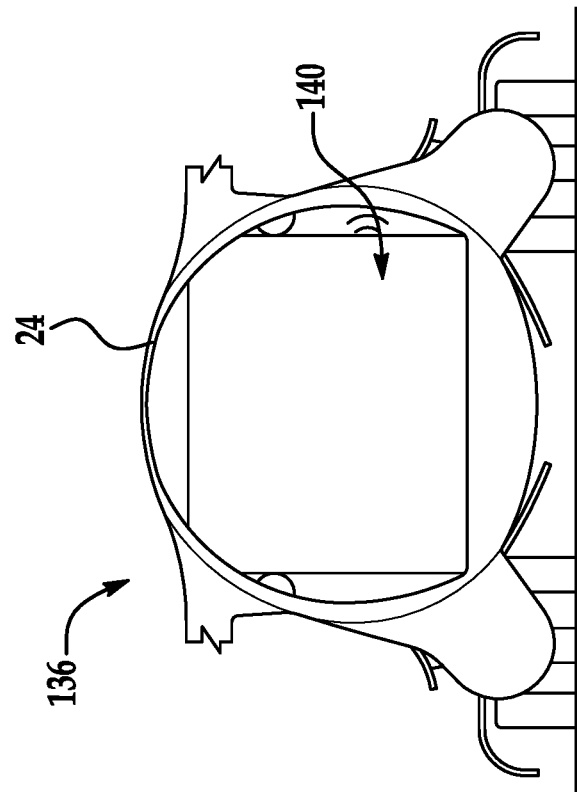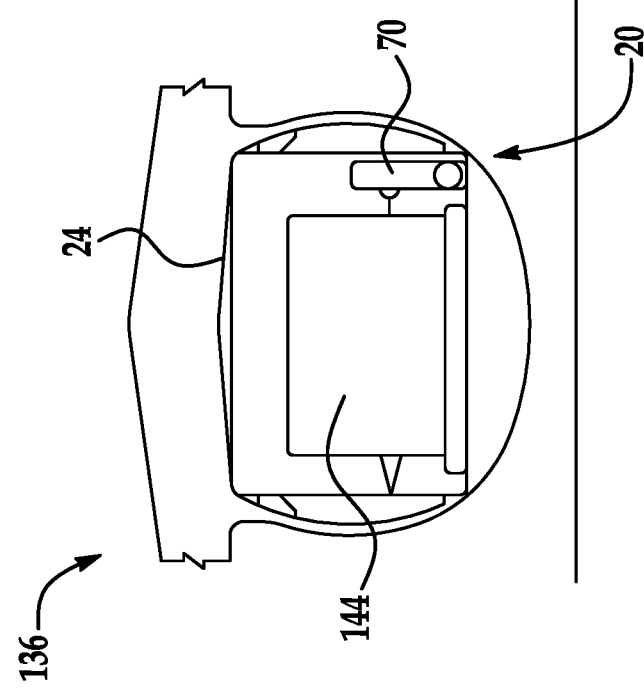

MODULAR EXPANDABLE TUBE ASSEMBLY AND LAUNCH SYSTEM

FIELD OF THE INVENTION

The invention relates to launch devices and systems, and more particularly to tubular launch devices and systems.

DESCRIPTION OF THE RELATED ART

Various applications may use deployable payloads that are launchable from a stationary or moving platform. For example, military applications that use land vehicles, aircrafts, surface ships, or underwater vehicles may include deployable munitions. In other applications, commercial and other non-lethal aircrafts may include deployable cargo, such as medicine, food, water, etc. However, some aircrafts may be suitable for launching payloads, but may not be equipped with a launch system. Moreover, conventional storage devices for the launchable tubular payloads use bulky structures that undesirably obscure entrances and exits of the aircraft.

SUMMARY OF THE INVENTION

A reconfigurable tube launch system for launching payloads from a platform is removably arranged in or on the platform, such as in an aircraft. The tube launch system includes at least one tube launch section or a plurality of tube launch sections that are removably connected to each other and aligned in an axial direction, which is also the launching direction or the direction of travel of the payloads. The system is modular in that tube launch sections may be added or removed to the system for different applications. The tube launch sections may be identically formed and interchangeable. Electrically powered wheels are arranged in each tube launch section for propelling the payloads. The payloads may be accelerated to a predetermined speed by a control system that controls the powered wheels. The tube launch system may advantageously be configured to use an already existing power source and control system of the platform such that the powered wheels are operated by the power source of the platform. In other exemplary embodiments, the tube launch system may be independently powered and operable relative to the electronics of the platform.

Another exemplary tube launch system includes a powered magazine that may be used with the tube launch sections or without the tube launch sections. In the exemplary embodiment in which the magazine is used without the tube launch sections, the magazine may rely on gravity and powered magazine wheels for launching the payloads directly out of the magazine. An endless conveyor and a plurality of powered magazine wheels are arranged in the magazine. The powered magazine wheels are used to transfer a payload from the endless conveyor out of the magazine. In the exemplary embodiment in which the tube launch system includes the tube launch sections, the powered magazine wheels transfers the payload from the endless conveyor to the tube launch sections. The magazine is arranged to extend in a direction that is normal to the launch direction, or the axial direction of the tube launch sections. A plurality of magazines may be used in a launch system and the magazines are interchangeable and modular such that the magazines may be reconfigured for different applications.

Using the modular tube launch system having the powered magazine and the powered tube launch sections is advantageous in that the tube launch system may be arranged on a platform that was not previously equipped with a launch system. Another advantage is that the tube launch system may be accommodated in any suitable location of the aircraft. For example, arranging the magazine to extend vertically relative to the tube launch sections prevents the tube launch system from obscuring entrance and exit space in the aircraft. Using the conveyor and the powered wheels enables the payloads to be vertically stacked within the magazine, such that the capacity of the magazine is ensured and the payloads are reliably fed to the tube launch sections. In an exemplary application in an aircraft, the arrangement of the tube launch system does not interfere with cargo space and may be arranged adjacent to other cargo.

According to an aspect of the invention, a tube launch system for launching payloads from a platform includes a plurality of tube launch sections that are removably connectable to each other and the platform.

According to an aspect of the invention, a tube launch system for launching payloads from a platform includes a plurality of electrically powered wheels that move the payloads along a body of the platform.

According to an aspect of the invention, a tube launch system for launching payloads from a platform is mountable to a land vehicle, aircraft, surface ship, underwater vehicle, or hypersonic vehicle.

According to an aspect of the invention, a magazine assembly for storing payloads and ejecting the payloads from a platform may include at least one powered magazine having a vertically extending housing.

According to an aspect of the invention, a tube launch system includes a plurality of powered tube launch sections and at least one powered magazine.

According to an aspect of the invention, a tube launch system for launching payloads from a platform includes at least one tube launch section that is removably mounted to the platform, a plurality of powered wheels that are electrically powered and arranged in the tube launch section for propelling the payloads through the tube launch section, and a power source configured to operate the powered wheels.

According to an embodiment of any paragraph(s) of this summary, the plurality of powered wheels may include two powered wheels that are radially spaced relative to each other.

According to an embodiment of any paragraph(s) of this summary, the tube launch system may include a plurality of unpowered wheels that are axially spaced from the powered wheels.

According to an embodiment of any paragraph(s) of this summary, the plurality of unpowered wheels may include two unpowered wheels that are radially spaced relative to each other and arranged downstream relative to the powered wheels.

According to an embodiment of any paragraph(s) of this summary, the unpowered wheels may be in axial alignment with the powered wheels.

According to an embodiment of any paragraph(s) of this summary, the power source may be formed on the platform for powering both electronics of the platform and the tube launch system.

According to an embodiment of any paragraph(s) of this summary, the power source may include a battery and the tube launch system is independently operable relative to the platform.

According to an embodiment of any paragraph(s) of this summary, the at least one tube launch section may include a plurality of tube launch sections that are removably connected to each other one after another in an axial direction.

According to an embodiment of any paragraph(s) of this summary, the tube launch sections may be powered in series by the power source.

According to an embodiment of any paragraph(s) of this summary, the tube launch system may include a controller that is in communication with the powered wheels for controlling a speed of the payload through the tube launch section.

According to an embodiment of any paragraph(s) of this summary, the tube launch system may include a release control arranged at an axial end of the tube launch section for controlling an orientation of the payload during release from the tube launch section.

According to an embodiment of any paragraph(s) of this summary, the tube launch system may include at least one magazine arranged adjacent the tube launch section for storing the payloads and feeding the payloads to the tube launch section.

According to an embodiment of any paragraph(s) of this summary, the magazine may include an endless conveyor and a plurality of powered magazine wheels that are electrically powered and engageable with the payloads to move the payloads from the endless conveyor to the tube launch section.

According to an embodiment of any paragraph(s) of this summary, the magazine may be elongated in a direction that is normal to a longitudinal axis of the tube launch section.

According to an embodiment of any paragraph(s) of this summary, the powered magazine wheels may be powered by the power source which is configured to power both the powered wheels in the tube launch section and the powered magazine wheels.

According to an embodiment of any paragraph(s) of this summary, the at least one magazine may include a plurality of interchangeable magazines that are each configured to feed the tube launch section or to feed another one of the magazines.

According to another aspect of the invention, a magazine assembly for storing payloads and ejecting the payloads from a platform may include at least one powered magazine having a vertically extending housing in which the payloads are vertically stacked, an endless conveyor arranged in the housing and having electrical contacts and a plurality of paddles for separating the payloads relative to each other, and a plurality of powered wheels that are electrically powered and engageable with the payloads for moving the payloads from the endless conveyor out of the housing.

According to an embodiment of any paragraph(s) of this summary, the at least one magazine may include a plurality of interchangeable magazines that are adjacent each other and in feeding communication for moving the payloads between the magazines.

According to still another aspect of the invention, a method of launching payloads from a platform includes removably attaching a plurality of tube launch sections to the platform, wherein each of the tube launch sections includes a plurality of powered wheels for propelling the payloads through the tube launch section, removably connecting each of the tube launch sections to each other one after another in an axial direction, and electrically connecting the powered wheels to an existing power source of the platform.

According to an embodiment of any paragraph(s) of this summary, the method may include removably attaching a magazine to the platform axially adjacent the plurality of tube launch sections, arranging the magazine to extend in a direction normal to the axial direction, storing the payloads in the magazine, and feeding the payloads to the tube launch sections using powered magazine wheels arranged between an endless conveyor of the magazine and one of the tube launch sections.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

The annexed drawings, which are not necessarily to scale, show various aspects of the invention.

FIG. 5 shows a sectional view of a magazine assembly for the tube launch system of FIG. 1 in accordance with an embodiment of the present application.

FIG. 6 shows a sectional view of a magazine assembly for the tube launch system of FIG. 1 in accordance with another embodiment of the present application.

FIG. 7 shows a sectional view of a magazine assembly for the tube launch system of FIG. 1 in accordance with still another embodiment of the present application.

FIG. 12 shows a front view of a fuselage of the aircraft of FIG. 10.

FIG. 13 shows a rear view of the fuselage of the aircraft of FIG. 10.

DETAILED DESCRIPTION

The principles described herein have particular application in launching systems that are suitable for use in various applications. Suitable applications may include land vehicles, aircrafts, surface ships, underwater vehicles, and hypersonic vehicles that are configured to launch a payload, and more particularly, a tubular payload. Exemplary applications may be military applications or commercial applications using military craft or commercial craft such as commercial planes, cargo planes, helicopters, balloons, and other aerostats for delivery of payloads. Many different types of launching platforms may be suitable and the platforms may be manned or autonomous. Examples of launchable payloads include munitions, underwater vehicles, flares, chaff, drones, and any other non-lethal effectors or cargo (e.g., medical supplies, food, emergency kits, humanitarian goods, etc.) that may be packaged as a tubular payload and launched from a platform. As described herein, the term "payload" may be used to refer to either a payload or an individual payload item of the payload.

Figure 1:
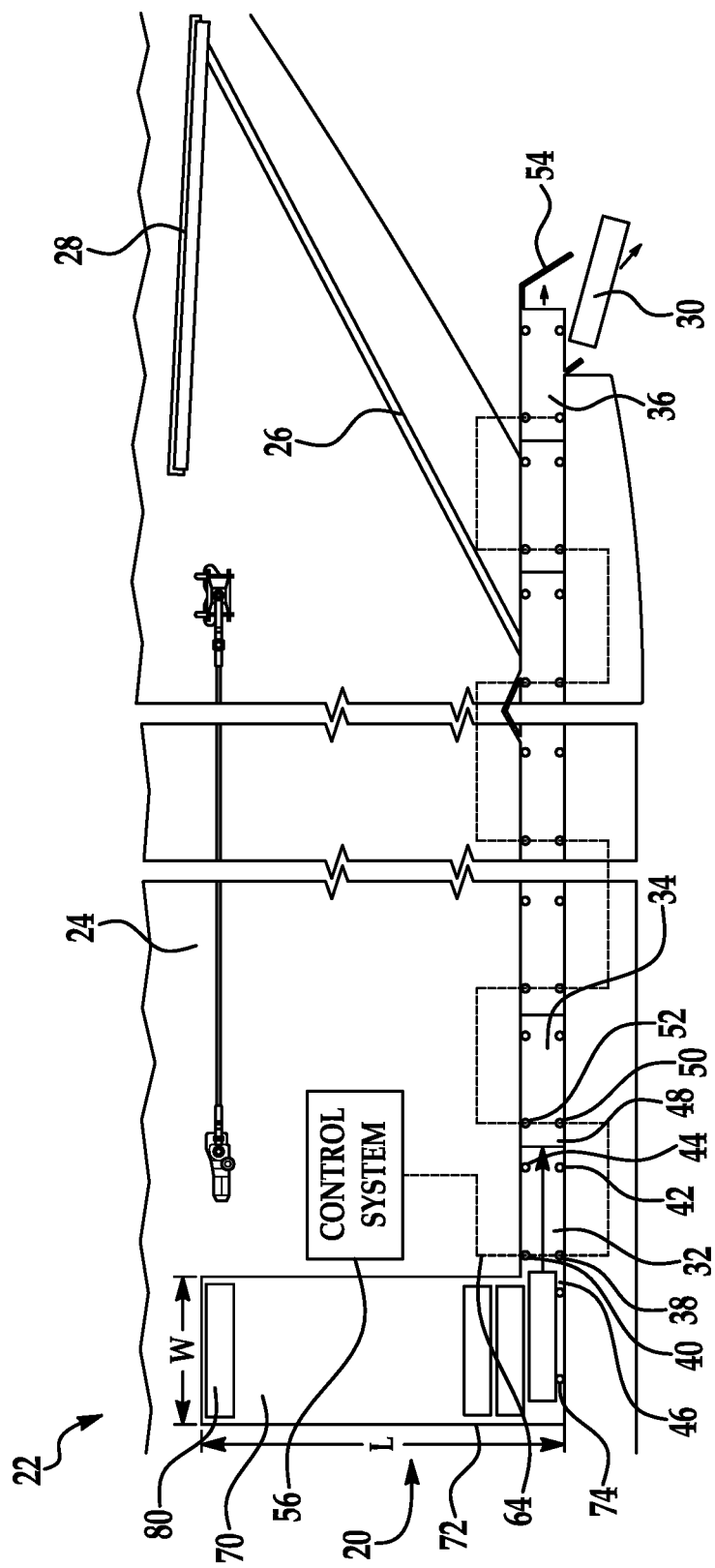
FIG. 1 schematically shows a tube launch system in accordance with an embodiment of the present application.

Referring first to FIG. 1, a tube launch system 20 in accordance with an embodiment of the present application is shown. The tube launch system 20 is removably attached or mounted to any suitable platform 22, such as an aircraft. Removably attaching the tube launch system 20 to the platform 22 enables the tube launch system 20 to be adapted to conventional platforms which may not be equipped with a launch system. The tube launch system 20 may also be modular in that the tube launch system 20 may be arranged in different platforms and reconfigured for particular applications. In an exemplary aircraft platform, the tube launch system 20 may be mounted to an aircraft fuselage 24 having a ramp 26 and a ramp door 28. As shown in FIG. 1, the tube launch system 20 may be arranged away from the ramp door 28 to prevent obtrusion of the ramp door 28.

The tube launch system 20 is arranged to launch any suitable tubular payload 30 from the platform 22 and includes at least one tube launch section 32 that is removably mounted to the platform 22. The tube launch section 32 may be mounted to the platform 22 using any suitable mounting bracket or hardware, including a strap or harness, that is compatible with the platform 22. Multiple tube launch sections 32, 34, 36 may be provided and the number of tube launch sections is dependent on a particular application. The length of the tube launch system 20 is adjustable as tube launch sections may be added or removed relative to the platform.

The tube launch sections 32, 34, 36 are also removably connected to each other one after another in an axial direction, i.e. in the launch direction. Any mechanical connection for securing the tube launch sections 32, 34, 36 and preventing binding between adjacent tube launch sections may be suitable. Exemplary tube launch section connectors may include threaded connectors, clamps, quick couplers, fasteners, clips, hooks, snaps, straps, ties, interlocking keys, magnets, etc., or any combination thereof. A receiving tube launch section 32 is arranged at an upstream axial end of the tube launch sections 32, 34, 36 and is configured to receive the payload 30. At least one intermediate launch section 34, or a plurality of intermediate launch sections are axially arranged between the first tube launch section 32 and an exit tube launch section 36 that is arranged at a downstream or opposite axial end of the tube launch sections 32, 34, 36 for launching the payload 30 from the tube launch system 20.

The tube launch sections 32, 34, 36 are arranged to be in axial and radial alignment relative to each other to ensure smooth travel of the payload 30 through all of the tube launch sections 32, 34, 36. Each tube launch section 32, 34, 36 is tubular and may have a similar or identical size, such that the tube launch sections 32, 34, 36 may be interchangeable. The size of the tube launch sections 32, 34, 36 may be dependent on the size of the payload 30 to be launched. The elongated length of the tube launch sections 32, 34, 36 may extend in the direction of the longitudinal axis of the platform 22, such as the longitudinal axis of the fuselage 24 of the aircraft. Each of the tube launch sections 32, 34, 36 may have an axial length that is between 1 and 2 meters (between 3 and 6 feet), and any suitable diameter to support a corresponding payload. The tube launch sections 32, 34, 36 may extend along any suitable length of the platform 22. The tube launch system 20 may be sized up or down for different applications and different payloads to be launched.

Propulsion of the payload 30 is achieved using a plurality of electrically powered wheels 38, 40 arranged in each tube launch section 32, 34, 36. With reference to the receiving tube launch section 32, at least two powered wheels 38, 40 are rotatably mounted within the tube launch section 32 and radially spaced relative to each other such that the powered wheels 38, 40 are proximate an outer diameter of the tube launch section 32. More than two powered wheels may be provided and the number of powered wheels may be dependent on the size of the tube launch section and/or the size of the payload 30. The powered wheels 38, 40 may also be referred to as friction wheels or electric wheels. When the payload 30 is engaged between the powered wheels 38, 40, actuation of the powered wheels 38, 40 accelerates the payload 30 to a predetermined speed through the tube launch sections 32, 34, 36 prior to release of the payload 30. Using the powered wheels 38, 40 is advantageous in that the payload 30 may be propelled without compressed gas or other propellants used in conventional launch systems.

The propulsion device may further include a plurality of unpowered wheels 42, 44 that are axially spaced from the powered wheels 38, 40 within each of the tube launch sections 32, 34, 36. With reference to the receiving tube launch section 32, the unpowered wheels 42, 44 are rotatably mounted within the tube launch section 32 and are radially spaced relative to each other and are arranged proximate the outer diameter of the tube launch section 32. The unpowered wheels 42, 44 may have a radial spacing that is equal to the radial spacing of the radial spacing between the powered wheels 38, 40, and the radial spacing may be predetermined. The axial distance between the two powered wheels 38, 40 and the two unpowered wheels 42, 44 may also be predetermined to ensure contact with the payload 30 during travel of the payload 30 through the tube launch sections 32, 34, 36. More than two unpowered wheels 42, 44 may be provided and the unpowered wheels 42, 44 are arranged downstream of the powered wheels 38, 40 in the launch direction.

Any arrangement of powered wheels and unpowered wheels may be suitable and the arrangement may be dependent on the application. In an exemplary embodiment, the powered wheels 38, 40 may be arranged proximate an upstream axial end 46 of the tube launch section 32 and the unpowered wheels 42, 44 may be arranged proximate a downstream axial end 48 of the tube launch section 32. In an arrangement in which at least one intermediate tube launch section 34 is connected to the receiving tube launch section 32, an axial spacing between the unpowered wheels 42, 44 of the receiving tube launch section 32 and the powered wheels 50, 52 of the intermediate tube launch section 34 may be less than an axial spacing between the powered wheels 38, 40 and the unpowered wheels 42, 44 in the tube launch section 32. The arrangement of the powered wheels and the unpowered wheels ensures that the payload 30 will be supported by at least four wheels at any axial position along the tube launch sections 32, 34, 36.

The payload 30 is supported along the wheels as the payload 30 travels from the receiving tube launch section 32 through the intermediate tube launch section 34, or a plurality of intermediate tube launch sections, to the exit tube launch section 36. The exit tube launch section 36 may further include a release control 54 that is arranged at a releasing end of the exit tube launch section 36 from which the payload 30 is launched from the tube launch system 20. The release control 54 includes any suitable mechanical and/or electrical components and may be used to control a nose up or nose down orientation of the payload 30 as the payload 30 exits the tube launch sections 32, 34, 36.

Figure 2:
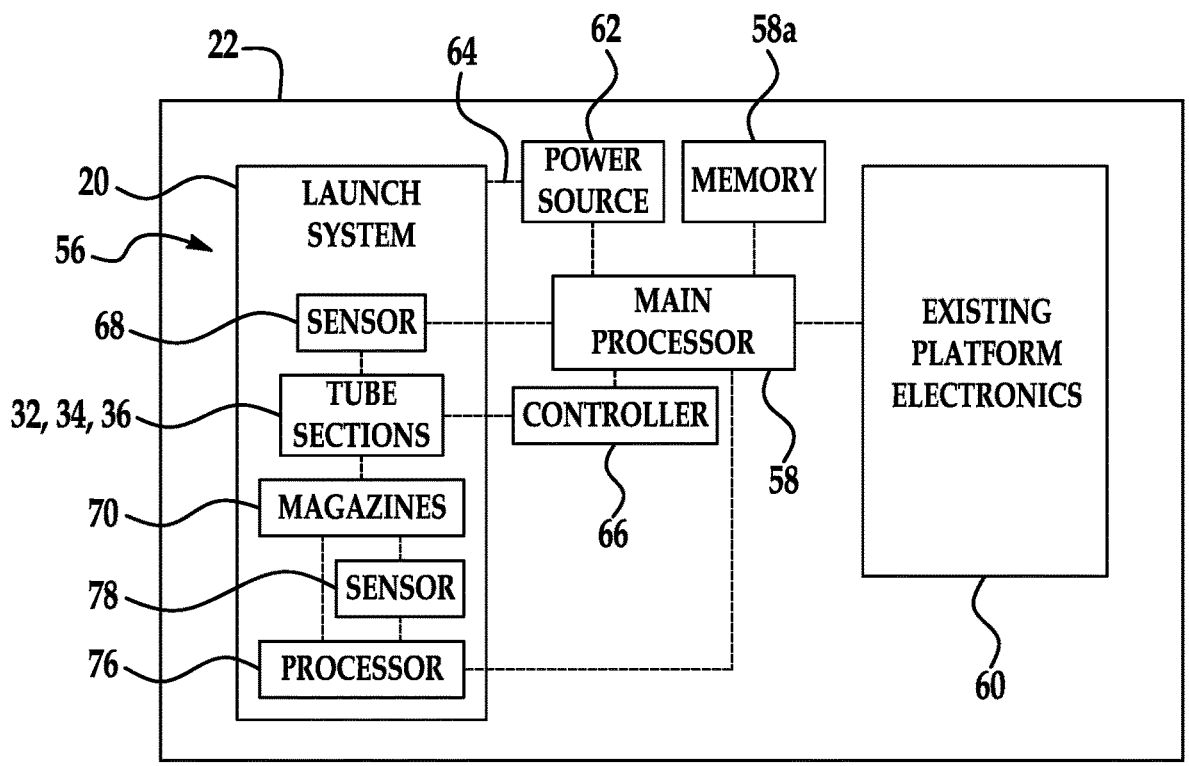
FIG. 2 schematically shows a control system for the tube launch system of FIG. 1.

With further reference to FIG. 2, actuation and operation of the tube launch system 20 may be performed using any suitable control system 56. The control system 56 may be a control system that already exists as part of the platform 22 or the control system 56 may be independently operable from the control system of the platform and able to be integrated with the platform control system. In an exemplary embodiment of the control system 56, the control system 56 includes a main processor 58 having a memory 58a. The memory 58a is configured for storing data such as various launch or mission sequences. The main processor 58 may include any suitable processing device and memory device for storing data pertaining to operation of existing platform electronics 60 that are used for normal operation and non-launching functions of the platform 22.

The control system 56 further includes a power source 62 that is in communication with the main processor 58. The power source 62 may be any suitable power source, such as a DC or AC motor. In other exemplary embodiments, the power source 62 may use hydraulic or pneumatic actuators. In an exemplary application, the power source 62 may be an already existing power source 62 of the platform 22. In the exemplary application in which the power source 62 is already existing on the platform 22, the powered wheels 38, 40, 50, 52 are advantageously powered by the same power system of the platform 22 without providing an additional power source for the tube launch system 20. The release control 54 of the exit tube launch section 36 may also be powered by the power source 62. In another exemplary application, the power source 62 may be a battery, or other power source, that is removable relative to the platform 22 and movable with the tube launch system 20, such that the tube launch system 20 is powered and operable independently from the existing power source of the platform 22.

The powered wheels 38, 40, 50, 52 are powered by the power source 62 and the tube launch system 20 may be connected to the power source 62 using any suitable connection 64. A suitable connection 64 may be a plug-in-type connection. FIG. 1 shows an exemplary configuration of the powered wheels 38, 40, 50, 52 in which the powered wheels 38, 40, 50, 52 are arranged in series and the single power source 62 is used to power all of the tube launch sections 32, 34, 36. The control system 56 may further include a controller 66 that is in communication between the main processor 58 and the tube launch sections 32, 34, 36. The controller 66 may be used to accelerate the powered wheels 38, 40, 50, 52 to achieve a predetermined speed of the payload 30 which is dependent on the application.

The tube launch system 20 may include at least one sensor 68 that is configured to detect a speed or acceleration of the payload 30 and is in communication with the main processor 58, whereby the main processor 58 can control the speed in response to a detected speed. The at least one sensor 68 or other sensors may be provided to determine other suitable operational characteristics of the tube launch sections 32, 34, 36. For example, sensors may be provided to determine a position of the payload 30 within the tube launch sections 32, 34, 36. Once the payload 30 has reached a predetermined axial position, another payload may be supplied to the receiving tube launch section 32. In another example, if the sensor 68 detects that the payload 30 is displaced within one of the tube launch sections, 32, 34, 36, the main processor 58 may be configured to disconnect the power source 62 or deactivate the powered wheels 38, 40, 50, 52 to prevent the tube launch sections 32, 34, 36 from being jammed. In still another example, the sensor 68 may be used to control the release control 54, such that the release control 54 may be deactivated to prevent payloads from being released, or reconfigured to release payloads in a nose up or nose down orientation.

The payloads are fed into the receiving tube launch section 32 using at least one magazine 70 that is also used to store the payloads in the platform 22. The magazine 70 may also be removably attached to the platform 22 such that a plurality of magazines may be provided or the magazine may be arranged on different platforms that were not previously equipped with a launch system. The modularity of the magazine 70 enables magazines to be added or removed depending on a particular application. The magazine 70 may be mounted to the platform 22 using any suitable mounting bracket or hardware, such as cargo-type straps. The magazine 70 is arranged axially adjacent the receiving tube launch section 32 and is configured to hold the payloads in a stacked arrangement. A housing 72 of the magazine 70 has a length L in a direction that is normal to the longitudinal axis of the tube launch sections 32, 34, 36 and elongated relative to a width W of the magazine 70 that extends in the direction of the longitudinal axis. In an exemplary embodiment, when the platform 22 is arranged substantially horizontally, the payloads are vertically stacked within the housing 72. The arrangement of the magazine 70 is advantageous in that the magazine 70 is arranged to accommodate less lateral space within the platform 22 as compared with conventional storage devices.

The housing 72 of the magazine 70 includes at least one powered magazine wheel 74, or a plurality of powered magazine wheels, that are rotatably mounted and engageable with the payloads to move the payloads from the magazine 70 to the receiving tube launch section 32. Each powered magazine wheel 74 may be a friction wheel or electric wheel that is similar to the powered wheels 38, 40, 50, 52 of the tube launch sections 32, 34, 36. The magazine 70 may also be controlled using the control system 56, which may be part of the platform 22 or independent to the platform. The magazine 70 and the tube launch sections 32, 34, 36 may be controlled by a same control system or independent control systems that are able to be integrated with each other. In an exemplary embodiment, the magazine 70 may include a processor 76 that is configured to operate the magazine 70 and communicate with the main processor 58. The processor 76 may be configured to control the magazine 70 and execute a predetermined launch sequence based on mission data stored in the memory 58a of the main processor 58.

At least one sensor 78 may be arranged to detect an operational characteristic of the magazine 70, such as a position of the payload or when a payload is loaded. For example, when the sensor 78 detects that the payload 30 is loaded in the magazine 70, the processor 76 may communicate with the main processor 58 to actuate the powered wheels 38, 40, 50, 52 of the tube launch sections 32, 34, 36.

The sensor 78 may be configured to detect a position of the payload 30 within the housing 72 of the magazine 70 such that the sensor 78 can detect jams in the housing 72 or whether the housing 72 is empty. The payloads may be manually or automatically loaded into the housing 72 through an attachment or loading door 80 of the housing 72 which is arranged at an opposite end of the housing 72 relative to the powered magazine wheels.

FIGS. 3-7 show exemplary magazines or magazine assemblies that may be suitable for use in different applications. Each of the magazine assemblies is suitable for use with the tube launch sections 32, 34, 36 and the control system 56 described herein. In other exemplary embodiments, the magazine assemblies may be suitable for use without the tube launch sections 32, 34, 36, and the magazine assemblies may use gravity to launch payloads directly from the magazine and out of the platform. The arrangements of the magazines are merely exemplary and many different arrangements of the magazines or magazine assemblies are possible.

Figure 3:
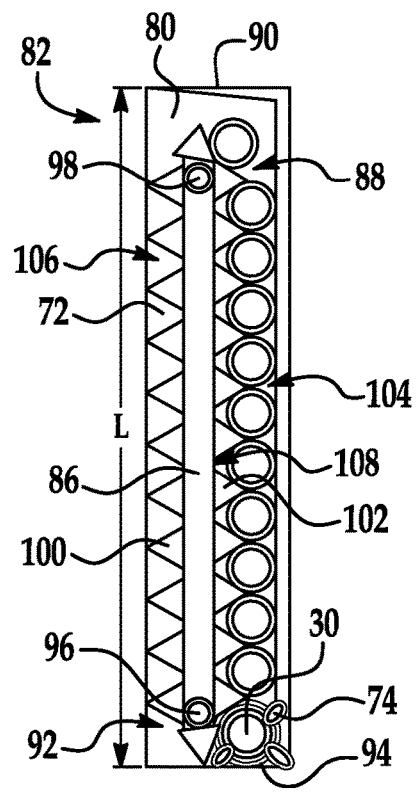
FIG. 3 shows a sectional view of a magazine for the tube launch system of FIG. 1 in accordance with an embodiment of the present application.
Figure 4:
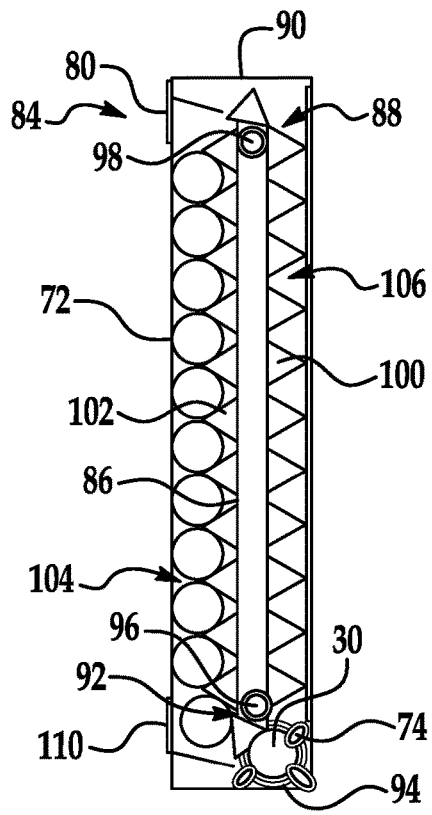
FIG. 4 shows a sectional view of a magazine for the tube launch system of FIG. 1 in accordance with another embodiment of the present application.

FIGS. 3 and 4 each show a single magazine 82, 84 that contains a plurality of payloads. Each housing 72 includes a track or conveyor 86 that is supported within the housing 72. The conveyor 86 is an endless conveyor and may be any suitable conveyor type, such as a belt or chain type conveyor. A length of the conveyor 86 extends along the length L of the housing 72 and the conveyor 86 is configured to make a U-turn 88 at a top end 90 of the housing 72 and another U-turn 92 at a bottom end 94. The conveyor 86 may be configured for continuous movement about spaced drives 96, 98. Any suitable drive mechanism may be used, such as a Geneva drive. Each powered magazine wheel 74 is arranged proximate the bottom end 94 of the housing 72 for receiving the payload 30 from the conveyor 86 and transferring the payload 30 out of the magazine 82, 84 to the tube launch sections 32, 34, 36.

The conveyor 86 includes a plurality of paddles 100, 102 that are arranged about the conveyor 86 to rotate with the conveyor 86 and engage between the payloads. The plurality of paddles 100, 102 may be formed along an entire perimeter of the conveyor 86 such that each payload 30 is always engaged by a paddle 100, 102 on each side. The paddles 100, 102 may have any suitable shape. In an exemplary embodiment, the paddles may have a tapered shape that enables the paddle to release the payload when the paddle is rotating about the U-turn 92 at the bottom end 94 of the housing 72. The conveyor 86 are arranged to have a storage side 104 which receives the payloads and stores the payloads, and an adjacent empty side 106 through which the conveyor 86 moves without supporting any payloads. The storage side 104 is configured to receive the payloads through the loading door 80. The conveyor 86 may further include at least one electrical contact 108 or a plurality of electrical contacts to ensure electrical connectivity with the payloads.

As shown in FIG. 3, the magazine 82 has the storage side 104 being arranged adjacent the powered magazine wheels such that the storage side 104 is proximate the tube launch sections relative to the empty side 106. The tubular payloads may be vertically arranged above the powered magazine wheels. The loading door 80 is arranged on the empty side 106 such that the payloads are dropped in the housing 72 and carried to the storage side 104. FIG. 4 shows a different arrangement in which the loading door 80 is arranged on the storage side 104 such that the payloads may be dropped directly into the storage side 104 through the loading door 80. In the arrangement of FIG. 4, the empty side 106 is arranged adjacent the powered magazine wheels, such that the empty side 106 is proximate the tube launch sections 32, 34, 36 relative to the storage side 104. A connecting door 110 may also be arranged on the storage side 104 of the housing 72 for connecting the storage side 104 to the powered magazine wheel 74. The conveyors in FIGS. 3 and 4 rotate in opposite directions relative to each other.

FIGS. 5-7 each show a magazine assembly 112, 114, 116 that includes at least two magazines. In exemplary applications, more than two magazines may be provided and the number of magazines provided is dependent on the application. More than one magazine carrying different payload types may be provided for particular applications. The magazines are modular and interchangeable such that the magazines may be connectable and disconnectable relative to each other for reconfiguring the magazine assembly. The magazines may be arranged adjacent each other in the longitudinal direction or launch direction of the tube launch system 20 (shown in FIG. 1). In other exemplary applications, the magazines may be vertically stacked relative to each other. Adjacent magazines may be identical in configuration and arranged in a same orientation or in a different orientation relative to each other, or adjacent magazines may have different configurations and different orientations.

FIG. 5 shows a magazine assembly 112 in which two identical magazines are arranged and oppositely orientated relative to each other. The magazines 84, 84' may have features that are similar to the magazine 84 shown in FIG. 4, in which the loading door 80 is arranged on the storage side 104 and the empty side 106 is arranged adjacent the powered magazine wheels. The magazine 84' is vertically flipped relative to the magazine 84 and is configured to feed the payloads to the magazine 84, such that the magazine assembly 112 has a single ejection point and the powered magazine wheel 74 of the magazine 84 is configured to receive payloads from both magazines 84, 84'. In the arrangement of FIG. 5, the storage side 104 of one of the magazines 84, 84' faces the storage side 104 of the other of the magazines 84, 84' such that the storage sides are arranged proximate each other and each empty side 106 is arranged as the outer side of the magazine assembly 112. The conveyors 86, 86' rotate in opposite directions relative to each other.

FIG. 6 shows a magazine assembly 114 in which two identical magazines are arranged adjacent to each other and have a same orientation. The magazines may have features that are similar to the magazine 84 shown in FIG. 4 in which the loading door 80 is arranged on the storage side 104 and the empty side 106 is arranged adjacent the powered magazine wheels. The storage side 104 of each magazine 84 is arranged on a side of the magazine 84 opposite to the tube launch sections such that the storage sides and empty sides are alternating in the arrangement of the magazines. Each magazine 84 of the magazine assembly 114 may include a separate loading door 80 and at least one separate powered magazine wheel 74 such that the magazine assembly 114 has two points of ejection to the tube launch sections. The magazines are in electrical communication with each other. For example, each magazine 70 may include a sensor 78a, 78b that is communication with the processor 76 (shown in FIG. 2) for monitoring when one of the magazines is feeding a payload 30 to the tube launch sections. The processor 76 is configured to control the ejection of the payloads in response to the sensors 78a, 78b. The conveyors rotate in the same direction relative to each other.

FIG. 7 shows a magazine assembly 116 in which two different magazines are arranged adjacent to each other. One of the magazines has features that are similar to the magazine 82 shown in FIG. 3 and the other magazine has features that are similar to the magazine 84 shown in FIG. 4. The storage side 104 of one of the magazines 82, 84 may face the storage side 104 of the other of the magazines 82, 84 such that the storage sides are arranged on the inside of the magazine assembly 116 and the empty sides are arranged on the outside of the magazine assembly 116. The magazines 82, 84 may each be configured to separately eject payloads to the tube launch sections, similar to the magazine assembly 114 of FIG. 6, or in another embodiment, the magazines 82, 84 may be configured for cross-loading. Cross-loading doors 118, 120 may be arranged at the top end 90 and at the bottom end 94 of the magazine assembly 116, respectfully. Using the cross-loading doors 118, 120 enables the magazines 82, 84 to feed into each other. For example, if a sensor, such as a sensor that is similar to sensors 78a, 78b of FIG. 6, determines that movement of the payloads through one of the magazines 82, 84 is obstructed, or jammed, the processor 76 may be configured to control one of the magazines 82, 84 to feed into the other of the magazines 82, 84.

Figure 8:
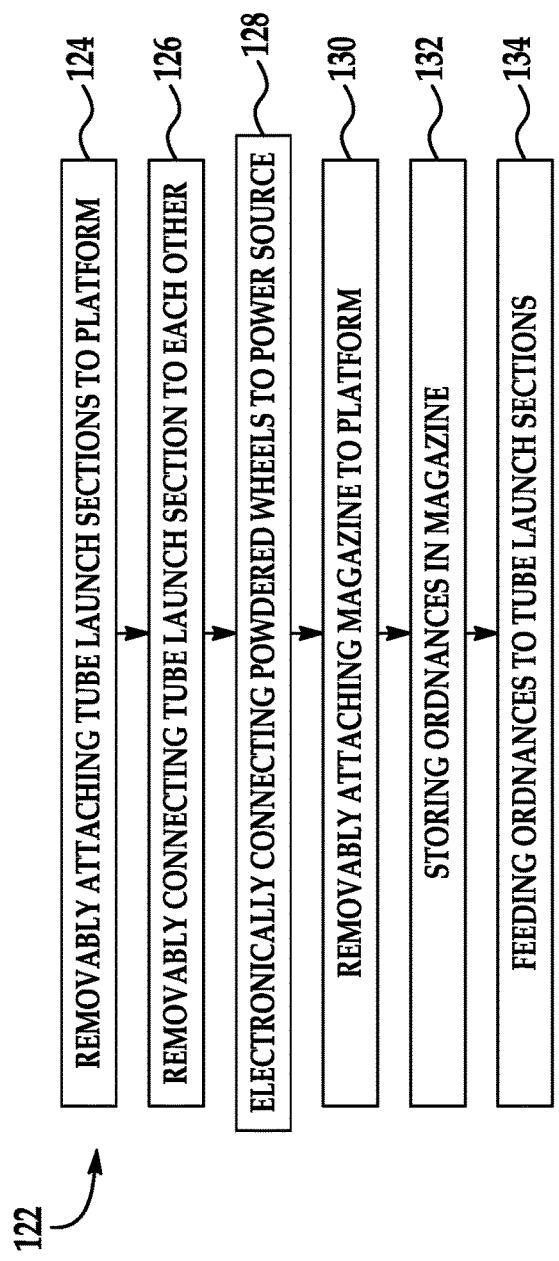
FIG. 8 shows a flowchart illustrating a method of launching a payload from a platform using the tube launch system of FIG. 1.

FIG. 8 shows a flowchart for a method 122 of launching payloads from a platform 22, using the tube launch system 20 described herein. Step 124 of the method 122 includes removably attaching a plurality of tube launch sections 32, 34, 36 (shown in FIG. 1) to the platform 22, wherein each of the tube launch sections 32, 34, 36 includes a plurality of powered wheels 38, 40, 50, 52 (shown in FIG. 1) for propelling the payloads through the tube launch section 32, 34, 36. Step 126 of the method 122 includes removably connecting each of the tube launch sections 32, 34, 36 to each other one after another in an axial direction. Step 128 of the method 122 includes electrically connecting the powered wheels 38, 40, 50, 52 to an existing power source 62 (shown in FIG. 2) of the platform 22.

Step 130 of the method 122 includes removably attaching a magazine or magazine assembly 70, 82, 84, 112, 114, 116 (shown in FIGS. 1-7) to the platform 22 axially adjacent the plurality of tube launch sections 32, 34, 36. For example, the magazine may be attached to the platform 22 using a cargo-type strap. Step 130 of the method 122 includes arranging the magazine or magazine assembly 70, 82, 84, 112, 114, 116 to extend in a direction normal to the axial direction of the tube launch sections 32, 34, 36 such that the length of the housing 72 of the magazine is elongated relative to a housing width which extends in the direction of the tube launch sections 32, 34, 36. Step 132 of the method 122 includes storing the payloads in the magazine or magazine assembly 70, 82, 84, 112, 114, 116. Step 134 of the method 122 includes feeding the payloads to the tube launch sections 32, 34, 36 using powered magazine wheels, such as the powered magazine wheel 74 (shown in FIGS. 3-6) arranged between a conveyor 86 (shown in FIGS. 3 and 4) of the magazine or magazine assembly 70, 82, 84, 112, 114, 116 and one of the tube launch sections 32, 34, 36.

Figure 9:
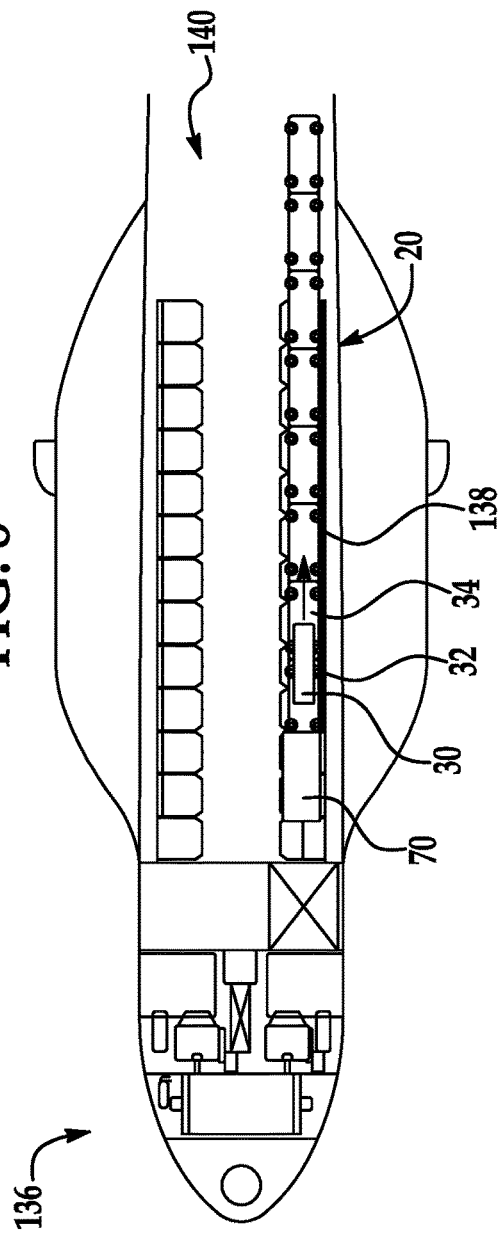
FIG. 9 shows a top view of an exemplary application for the tube launch system of FIG. 1 in which an aircraft includes the tube launch system arranged in a floor of the aircraft under a plurality of seats.

FIGS. 9-15 show exemplary applications in which the tube launch system 20 of FIG. 1 has different arrangements in an aircraft 136. FIG. 9 shows an exemplary arrangement in which the tube launch system 20 is arranged in a floor of the aircraft 136 under a seat 138 or a plurality of seats. The magazine 70 may be arranged at one end of a column of seats and the longitudinal axis of the tube launch sections 32, 34 may extend along the column of seats such that the payload 30 travels in a direction parallel with the column of seats and a longitudinal axis of the aircraft 136. The tube launch sections 32, 34 may extend beyond the entire length of the column of seats such that the payload 30 is launched out of a rear region 140 of the aircraft 136. In other exemplary embodiments, the tube launch system 20 may be arranged in an exterior wall or in a bulkhead of the aircraft. Using the tube launch system 20 enables mounting of the system in many different regions of the aircraft 136.

Figure 10:
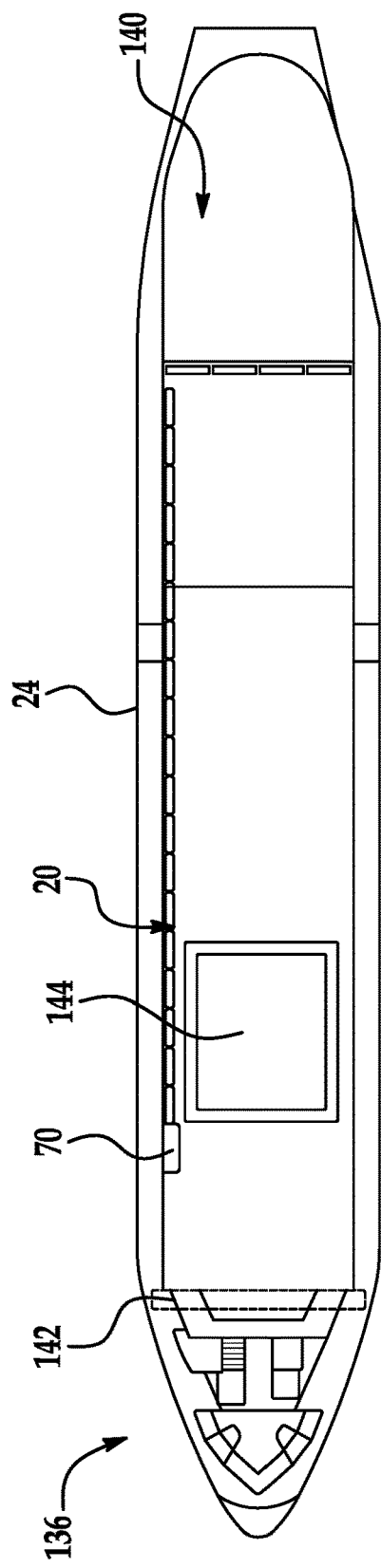
FIG. 10 shows a top view of another exemplary application for the tube launch system of FIG. 1 in which an aircraft includes the tube launch system arranged adjacent cargo of the aircraft.
Figure 11:
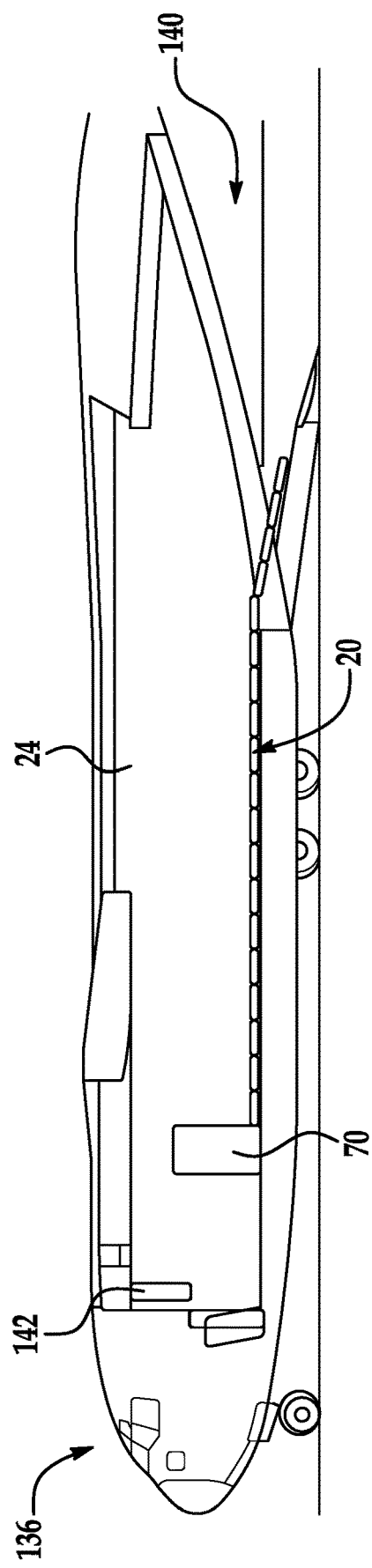
FIG. 11 shows a side view of the aircraft of FIG. 10.

FIGS. 10-13 show an arrangement in the aircraft 136 that is similar to the arrangement shown in FIG. 9 and further shows the seats of the aircraft 136 being removed. FIG. 10 shows a top view of the aircraft 136, FIG. 11 shows a side view of the aircraft 136, FIG. 12 shows a front view of the fuselage 24 of the aircraft 136, and FIG. 13 shows a rear view of the fuselage 24 of the aircraft 136. The aircraft 136 may include a cargo barrier 142. Advantageously, the magazine 70 is arranged adjacent the cargo barrier 142 and the space in which other cargo may be contained. As shown in FIGS. 10 and 12, cargo 144 may be arranged in the space without obtrusion by the tube launch system 20, as the cargo 144 is arranged adjacent to the magazine 70. As shown in FIG. 13, the tube launch system 20 advantageously does not obstruct the rear region 140 of the fuselage 24.

Figure 14:
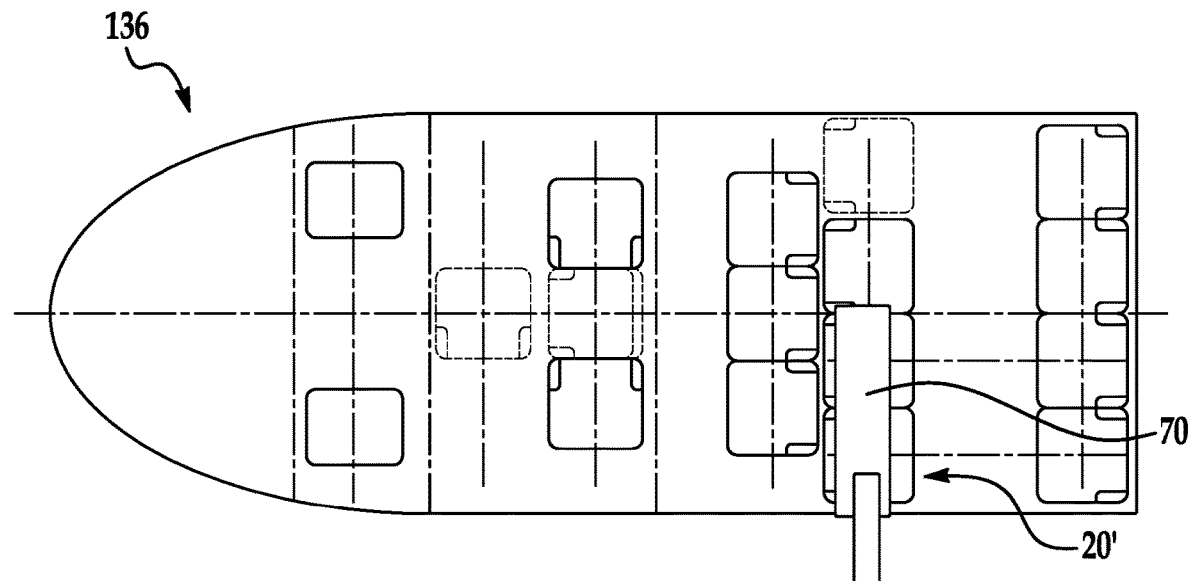
FIG. 14 shows a top view of another exemplary application and embodiment of the tube launch system in which a magazine is arranged in an aircraft and uses gravity for launching payloads.
Figure 15:
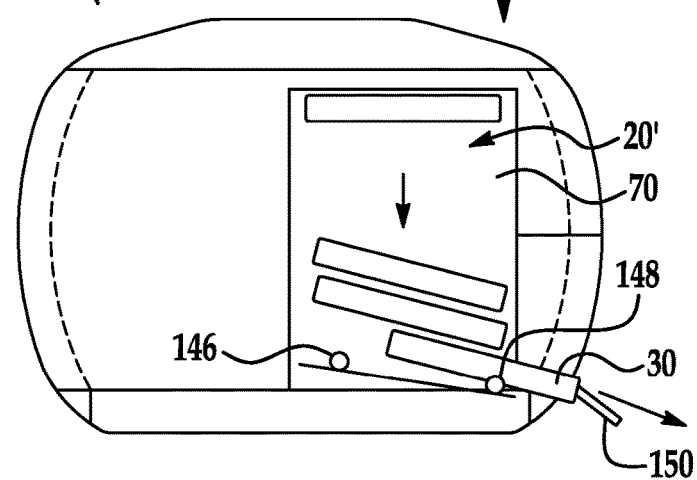
FIG. 15 shows a side view of the application and embodiment of the tube launch system of FIG. 14.

FIGS. 14 and 15 show the aircraft 136 including the tube launch system 20' using the magazine or magazine assembly 70, 82, 84, 112, 114, 116 (shown in FIGS. 1-7) without the tube launch sections, such that the tube launch system 20 may use gravity for releasing the payload 30 from the magazine. Any of the magazine arrangements shown in FIGS. 3-7 may be used. The magazine 70 may be arranged in a bulkhead or wall of the aircraft 136 to release the payload 30 from a side of the aircraft 136, or in a direction that is normal to the longitudinal direction of the aircraft 136. The magazine 70 may further include powered wheels or friction rollers 146, 148 that are arranged at a bottom of the magazine 70. The friction rollers 146, 148 may be powered for accelerating the payload 30 out of the magazine 70. A release control 150 may also be arranged at the bottom of the magazine 70 to control the orientation of the payload 30 in a nose up or nose down orientation when released.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A tube launch system for launching payloads from a platform, the tube launch system comprising:
    at least one tube launch section that is removably mounted to the platform, wherein the at least one tube launch section includes a plurality of tube launch sections that are removably connected to each other one after another in an axial direction;
    a plurality of powered wheels that are electrically powered and arranged in each of the plurality of tube launch sections for directly engaging the payloads to propel the payloads through the plurality of tube launch sections; and a power source configured to operate the powered wheels.

2. The tube launch system according to claim 1, wherein the plurality of powered wheels includes two powered wheels that are radially spaced relative to each other.

3. The tube launch system according to claim 1 further comprising a plurality of unpowered wheels that are axially spaced from the powered wheels.

4. The tube launch system according to claim 3, wherein the plurality of unpowered wheels includes two unpowered wheels that are radially spaced relative to each other and arranged downstream relative to the powered wheels.

5. The tube launch system according to claim 3, wherein the unpowered wheels are in axial alignment with the powered wheels.

6. The tube launch system according to claim 1, wherein the power source is formed on the platform for powering both electronics of the platform and the tube launch system.

7. The tube launch system according to claim 1, wherein the power source includes a battery and the tube launch system is independently operable relative to the platform.

8. The tube launch system according to claim 1, wherein the plurality of tube launch sections are powered in series by the power source.

9. The tube launch system according to claim 1 further comprising a controller that is in communication with the powered wheels for controlling a speed of the payload through the plurality of tube launch sections.

10. The tube launch system according to claim 1 further comprising a release control arranged at an axial end of the plurality of tube launch sections for controlling an orientation of the payload during release from the plurality of tube launch sections.

11. The tube launch system according to claim 1 further comprising at least one magazine arranged adjacent one of the plurality of tube launch sections for storing the payloads and feeding the payloads to one of the plurality of tube launch sections.

12. The tube launch system according to claim 11, wherein the magazine includes an endless conveyor and a plurality of powered magazine wheels that are electrically powered and engageable with the payloads to move the payloads from the endless conveyor to the one of the plurality of tube launch sections.

13. The tube launch system according to claim 12, wherein the endless conveyor has electrical contacts and a plurality of paddles for separating the payloads relative to each other.

14. The tube launch system according to claim 11, wherein the magazine is elongated in a direction that is normal to a longitudinal axis of the plurality of tube launch sections.

15. The tube launch system according to claim 14, wherein the powered magazine wheels are powered by the power source which is configured to power both the powered wheels in the plurality of tube launch sections and the powered magazine wheels.

16. The tube launch system according to claim 11, wherein the at least one magazine includes a plurality of interchangeable magazines that are each configured to feed the plurality of tube launch sections or to feed another one of the magazines.

17. The tube launch system according to claim 11, wherein the magazine includes a vertically extending housing in which the payloads are vertically stacked.

18. A tube launch system for launching payloads from a platform, the tube launch system comprising:

at least one tube launch section that is removably mounted to the platform;

a plurality of powered wheels that are electrically powered and arranged in the tube launch section for directly engaging the payloads to propel the payloads through the at least one tube launch section;

a power source configured to operate the powered wheels; and a plurality of unpowered wheels that are axially spaced from the powered wheels.

19. The tube launch system according to claim 18, wherein the unpowered wheels are in axial alignment with the powered wheels.

20. A tube launch system for launching payloads from a platform, the tube launch system comprising:

at least one tube launch section that is removably mounted to the platform;

a plurality of powered wheels that are electrically powered and arranged in the at least one tube launch section for directly engaging the payloads to propel the payloads through the at least one tube launch section;

a power source configured to operate the powered wheels; and at least one magazine arranged adjacent the at least one tube launch section for storing the payloads and feeding the payloads to the at least one tube launch section, wherein the at least one magazine includes an endless conveyor and a plurality of powered magazine wheels that are electrically powered and engageable with the payloads to move the payloads from the endless conveyor to the at least one tube launch section.

* * * * *